No. 658,980. Patented Oct. 2, 1900.
T. I. DUFFY.
SADDLE FOR BICYCLES, &c.
(Application filed Jan. 19, 1899.)
(No Model.) 2 Sheets—Sheet 1.
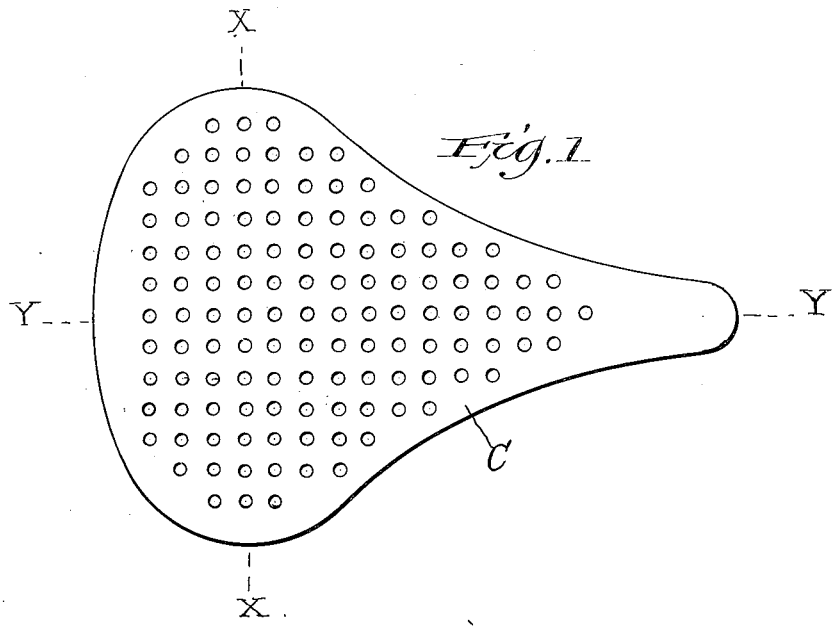
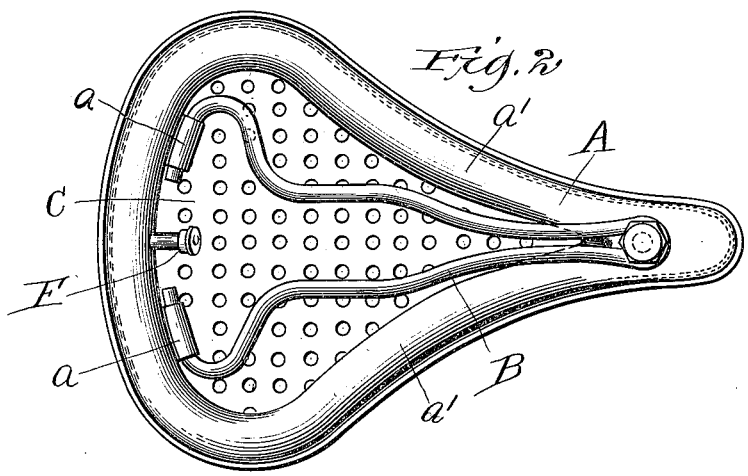
Witnesses
Inventor:
Thomas I. Duffy.
By Chas L. Page Atty's.

No. 658,980. Patented Oct. 2, 1900.
T. I. DUFFY.
SADDLE FOR BICYCLES, &c.
(Application filed Jan. 19, 1899.)
(No Model.) 2 Sheets—Sheet 2.
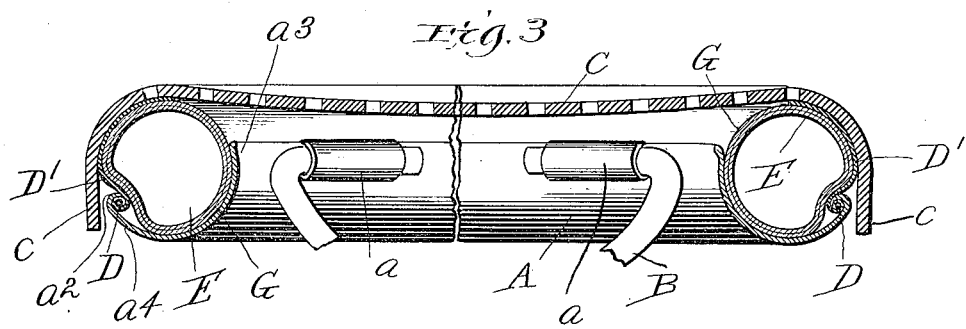
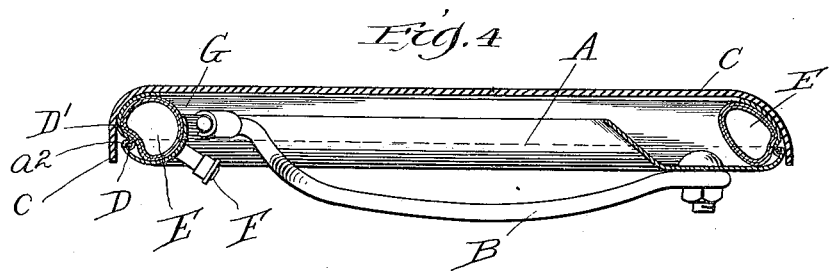
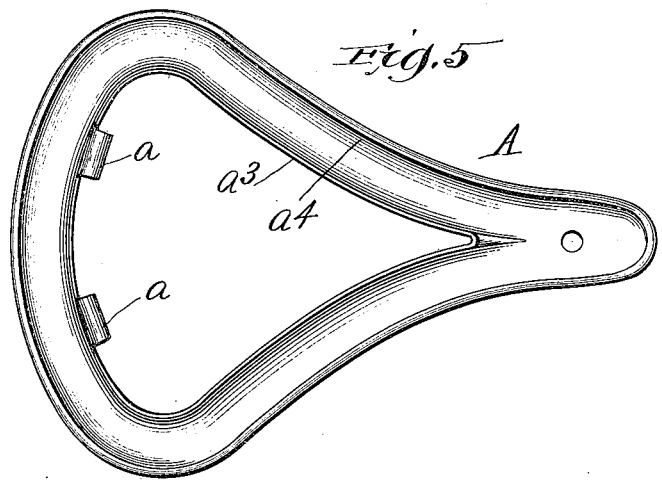
Witnesses:
Inventor:
Thomas I. Duffy.
By. Chas L. Page, Atty.

UNITED STATES PATENT OFFICE.

THOMAS I. DUFFY, OF CHICAGO, ILLINOIS, ASSIGNOR TO THE MORGAN & WRIGHT, OF SAME PLACE.

SADDLE FOR BICYCLES, &c.

SPECIFICATION forming part of Letters Patent No. 658,980, dated October 2, 1900.

Application filed January 19, 1899. Serial No. 702,735. (No model.)

*To all whom it may concern:*

Be it known that I, THOMAS I. DUFFY, a citizen of the United States, residing at Chicago, in the county of Cook, State of Illinois, have invented a certain new and useful Improvement in Saddles for Bicycles and other Velocipedes, of which the following is a specification.

Objects of my invention are to provide a light, economical, and durable construction of saddle, to provide a construction which shall effectively prevent the rider from being chafed by the edge of the saddle-frame, to provide an inflatable air-cushion arranged to prevent the rider from coming in contact with the edge of the seat-frame and at the same time to avoid the objectionable feature of a soft cushion as a seat for the rider, to permit a flexible seat-cover to be stretched tight over the space in an open frame by the inflation of an air-cushion, to provide a hard seat when the cushion is inflated, and to further avoid the discomfort of a seat formed by a large inflated air-cushion.

To the attainment of the foregoing and other useful ends, my invention consists in matters hereinafter set forth.

In the accompanying drawings, Figure 1 is a top plan view of my improved saddle. Fig. 2 is a bottom plan view of the same. Fig. 3 is a cross-section on line X X in Fig. 1. Fig. 4 is a section on line Y Y in Fig. 1. Fig. 5 represents the frame with the seat-cover detached.

The frame A, which is preferably of about the outline shown, is stamped or struck up from suitably-thick sheet metal, although, if preferred, it could be cast. I prefer, however, as a further improvement to provide a struck-up frame and to form it with bent lugs or sockets $a$ for the seat-spring B. The general outline of the frame is that of an ellipse, or approximate ellipse, forming a greater portion of the frame, but at one side spreading out laterally to form side portions $a'$, which extend forwardly and converge, so as to meet at the front end of the frame. The frame can be of one piece and is in the nature of an endless half-tube having lateral bends, substantially as illustrated, thereby leaving a space of considerable area under the seat-cover C and forming an exceedingly-simple construction of seat-frame, it being observed that its part or semitubular form insures great strength and at the same time permits it to be made exceedingly light.

The seat-cover C is of suitable flexible material—for example, leather—and can be perforated, so as to provide a comfortable seat in warm weather. While the seat-cover may be attached to the frame in any suitable or desired way, I prefer as a matter of further improvement to provide it with an endless, or practically endless, marginal wire or rod D, which can be let into the groove or space in the part-tubular frame, and there permit it to engage a marginal hook-shaped bead or lip $a^2$, formed along the outer edge of the frame.

In the saddle shown the wire or rod D referred to is attached to a flap D', which is in turn secured to the under side of the seat-cover near the edge of the latter. In this way the marginal portion $c$ of the seat-cover can lie alongside and conceal the outer edge portion of the seat-frame.

The groove or channel formed by the part-tubular seat-frame provides a seat for an inflatable air-tube E, made of rubber or other suitable impervious flexible material and provided with a suitable valve device F, whereby it can be inflated. The part-tubular frame is so formed that its inner side $a^3$ rises somewhat higher than its outer side $a^4$, in which way the side $a^3$ will form a suitably-high backing or abutment for the air-tube when the latter is inflated, as illustrated. By such arrangement the air-tube when inflated will bulge or extend laterally outward in a direction to overhang the outer marginal portion of the seat-frame, and thereby prevent the rider from coming in contact with the edge of the seat-frame. The inflatable air-tube is inclosed by a sack or tube G, of non-stretchable fabric, such as cloth or leather or other like suitable material. With this arrangement the air-tube can be inflated up to the point where it will form along the marginal portion of the saddle a comparatively-hard marginal air-cushion, and as the seat-cover C is arranged over and upon this marginal cushion the inflation of the latter will draw and maintain the seat-cover in a tightlystretched condition. With further reference to the wire or rod D, hereinbefore mentioned, I prefer employing a spring-wire or as its equivalent a spring rod or reed, bamboo, or the like. In order to detach the seat-cover, the user can press inwardly the rear edge of the portion of the seat formed by the cover and tube, (which latter should be deflated preparatory to detaching the seat-cover,) and by thus pressing inwardly said part of the seat-cover the wire or rod will be bent or bowed inwardly or toward the center of the frame to an extent to allow the rear portion of the rod or wire to be detached from the frame, after which by longitudinally shifting the seat-cover the wire or rod can be sprung out of the groove on the frame. The converse of this operation will serve to properly apply the rod or wire and seat-cover.

What I claim as my invention, and desire to secure by Letters Patent, is—

1. A saddle comprising an open frame having its upper surface provided with a groove or channel and having also a lip or bead formed at its outer edge, an inflatable air-tube seated within the said groove or channel, a flexible seat-cover arranged over the said tube and frame and having its marginal portion extended downward so as to cover or conceal the said lip or bead on the frame, a wire or rod adapted to be sprung into the groove or channel on the frame and to be retained in such position by the said bead or lip, and means for connecting the said wire or rod with the under side of the said flexible seat-cover, substantially as and for the purpose set forth.

2. A saddle comprising a frame having a groove or channel formed on its upper surface and having also a lip or bead formed at its outer edge; an inflatable air-tube seated and arranged within the said groove or channel; a flexible seat-cover arranged over the said tube and frame and having its marginal portion extended downward so as to cover or conceal the said lip or bead on the frame; a wire or rod bent into the proper shape and adapted to be sprung into the said groove or channel and retained in such position by the said lip or bead; and one or more flexible flaps or like means for connecting the said wire or rod with the under side of the said flexible cover, the inner wall of the said groove or channel extending upward beyond the said bead or lip, substantially as and for the purposes set forth.

THOMAS I. DUFFY.

Witnesses:
ARTHUR F. DURAND,
CHARLES G. PAGE.